United States Patent [19]

Schafer

[11] Patent Number: 4,708,091
[45] Date of Patent: Nov. 24, 1987

[54] ANIMAL WATERING APPARATUS

[76] Inventor: Kenneth L. Schafer, Rte. 3, Box 73, Le Sueur, Minn. 56058

[21] Appl. No.: 740,722

[22] Filed: Jun. 3, 1985

[51] Int. Cl.⁴ .............................................. A01K 7/00
[52] U.S. Cl. .......................................... 119/73; 119/61
[58] Field of Search ....................... 119/73, 75, 78, 72, 119/61

[56] References Cited

U.S. PATENT DOCUMENTS

| | | | |
|---|---|---|---|
| 232,077 | 9/1880 | Shaw et al. | 119/73 |
| 968,613 | 8/1910 | Van Ostrand | 119/72 |
| 1,086,785 | 2/1914 | Parkins | 119/78 |
| 1,522,828 | 1/1925 | Morgan | 119/73 |
| 1,835,352 | 12/1931 | Stangl | 119/73 |
| 2,629,040 | 2/1953 | Smith | 119/73 |
| 3,745,977 | 7/1973 | Martin | 119/73 |
| 4,033,340 | 1/1977 | Kuzara et al. | 119/73 |
| 4,100,885 | 7/1978 | Kapplinger | 119/73 |
| 4,320,720 | 3/1982 | Streed | 119/73 |
| 4,343,264 | 8/1982 | Schafer et al. | 119/73 |
| 4,395,974 | 8/1983 | Schafer et al. | 119/73 |
| 4,542,715 | 9/1985 | DeRoos | 119/73 X |

Primary Examiner—Robert P. Swiatek
Assistant Examiner—David L. Tarnoff
Attorney, Agent, or Firm—Burd, Bartz & Gutenkauf

[57] ABSTRACT

An animal watering apparatus having a tank for storing a supply of water. The tank has a top wall having a first tubular baffle surrounding an opening for accommodating a float valve assembly operable to supply water to the tank chamber. A second tubular baffle surrounds a drinking well. The first and second baffles are spaced from the walls of the housing to allow water to circulate about the baffles to minimize the freezing of the water in the float valve assembly and the drinking well. A closure associated with the drinking well minimizes the freezing of the water in the drinking well. The cover is a movable open float located within the drinking well. A second form of the cover is a pivotal lid that is moved by the animal to an open position to provide access to the drinking well.

23 Claims, 11 Drawing Figures

ANIMAL WATERING APPARATUS

BACKGROUND OF INVENTION

Animal watering devices having heat insulated tanks are used to prevent the drinking water from freezing when the amvient temperature is below freezing. It is common practice to include electric tank heaters in animal waters to prevent the water from freezing in the winter months. Tank heaters are expensive to operate, require an external source of electric power, and do not function to keep the water in the animal watering devices cool in the summer months. Stock waterers have been constructed with tanks insulated with foam or other insulated materials for keeping the water from freezing during the winter months and cool during the summer months. Examples of animal watering devices having foam plastic insulated walls are shown by Martin in U.S. Pat. No. 3,745,977; Kapplinger in U.S. Pat. No. 4,100,885; and Schafer et al in U.S. Pat. No. 4,343,264.

Tank-type watering devices have drinking wells closed with a movable cover or lid. The animal raises the lid to provide access to the water in the drinking well. Float-type covers associated with the drinking wells are disclosed by Martin in U.S. Pat. No. 3,745,977 and Kuzara et al in U.S. Pat. No. 4,003,340.

Float valve assemblies are used to automatically maintain the level of the water in the tank. The float valve assemblies are isolated from the drinking wells with baffles that extend downwardly from the inside of the top wall of the watering devices into the water therein. The baffles extend transversely between the side walls of the tank. The baffles act as guides for directing convection circulation of the tank.

SUMMARY OF INVENTION

The invention is directed to an animal watering apparatus or waterer for animals, such as cattle, sheep, horses, and the like. The apparatus has a housing or tank having heat insulated walls of urethane foam insulation sandwiched between plastic shells reinforced with glass fibers. The top wall of the housing has a first tubular baffle that extends down into the chamber and surrounds an opening that is open to the chamber. A float valve assembly located within the opening maintains the level of the water in the chamber. The float valve assembly is mounted in an upright pipe located within the chamber and connected to a source of water under pressure. The first baffle is spaced inwardly from the upright walls of the housing to allow the water to circulate around the first baffle thereby minimizing the freezing of the water in the float valve assembly. The top wall has a second tubular baffle that is spaced inwardly from the upright walls to allow water to circulate around the second baffle. The second baffle has a drinking well that is open to the water in the chamber and an opening in the top of the top wall to provide animal access to the water in the drinking well. The water circulating around the second baffle along with the water circulating within the drinking well minimizes the freezing of the water in the drinking well. A movable closure covers the drinking well to minimize freezing of the water. One embodiment of the watering apparatus has a float closure that floats on the water in the drinking well. The float closure has a mesh cover surrounding a porous core of foamed plastic. The animal moves the float closure down into the drinking well so that water flows through the float where it is accessible to the animal. The float closure returns to its closed position when the animal releases the closure. Another embodiment of the watering apparatus has a lid cover. The lid cover has an outer lip that is used by the animals to move the cover into an open position. A hinge assembly pivotally mounts the cover on the top wall in a manner so that when the animal leaves the cover it will automatically return to its closed position over the top of the drinking well.

The animal watering apparatus is used with any non-freezing waterline. Special below ground preparations such as digging and excavating is not needed to utilize the animal watering apparatus. Heaters are not used to maintain the temperature of the water above freezing. The normal circulation of the water within the chamber of the housing and the replenishing of the water into the chamber prevents the freezing of the water in cold weather environments. The animal watering apparatus does not utilize outside energy to minimize the freezing of the water. There are no operational heating costs and low maintenance costs.

DESCRIPTION OF PREFERRED EMBODIMENTS

Figure 1:
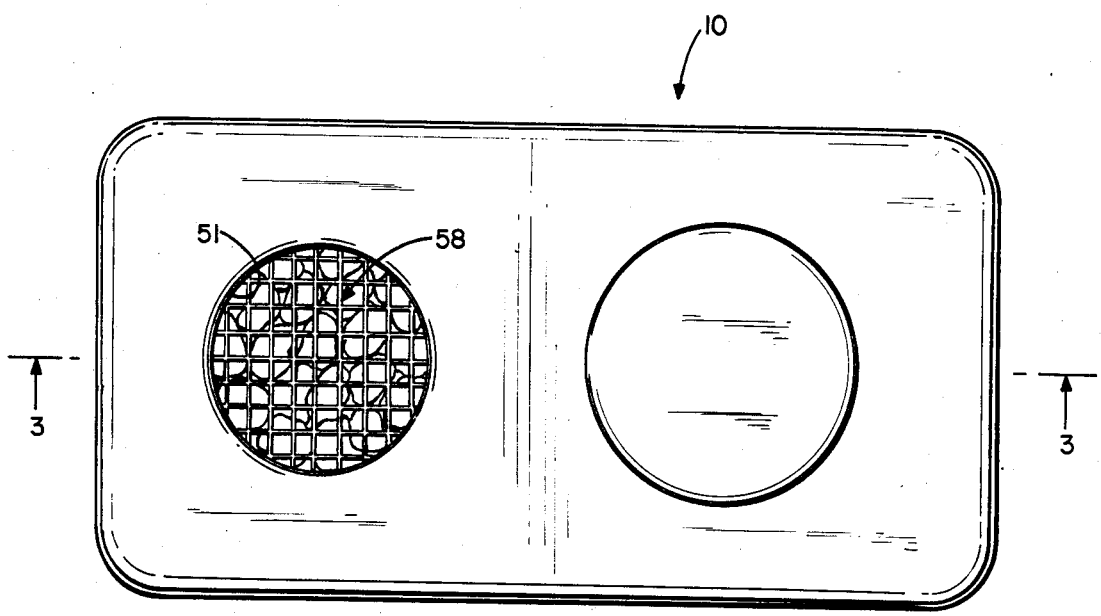
FIG. 1 is a top view of the animal watering apparatus of the invention.
Figure 2:
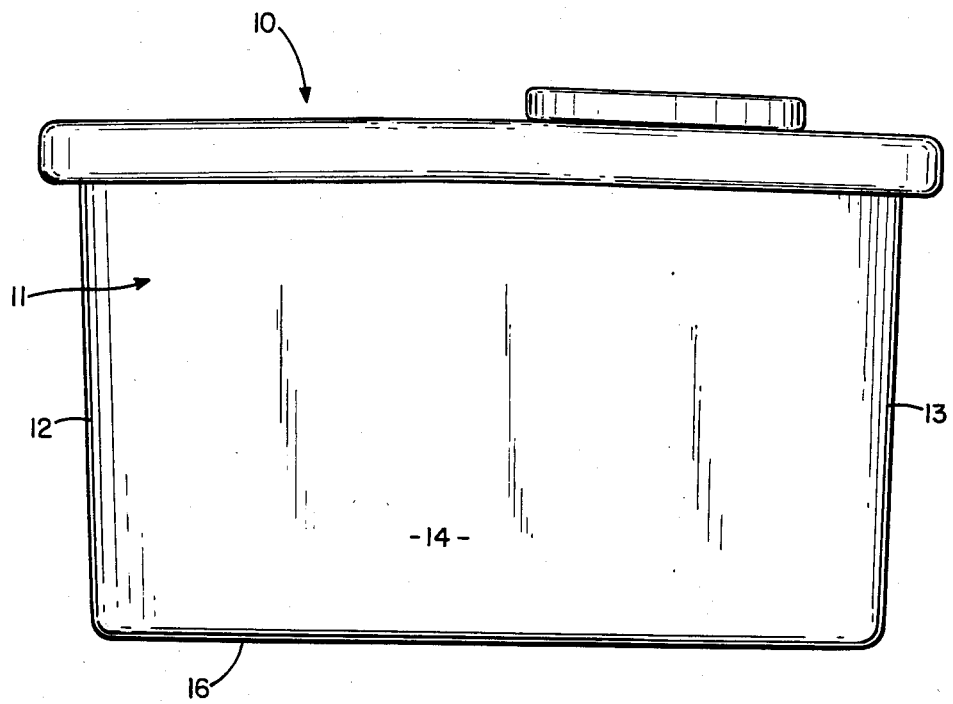
FIG. 2 is a side elevational view of the animal watering apparatus of FIG. 1.
Figure 3:
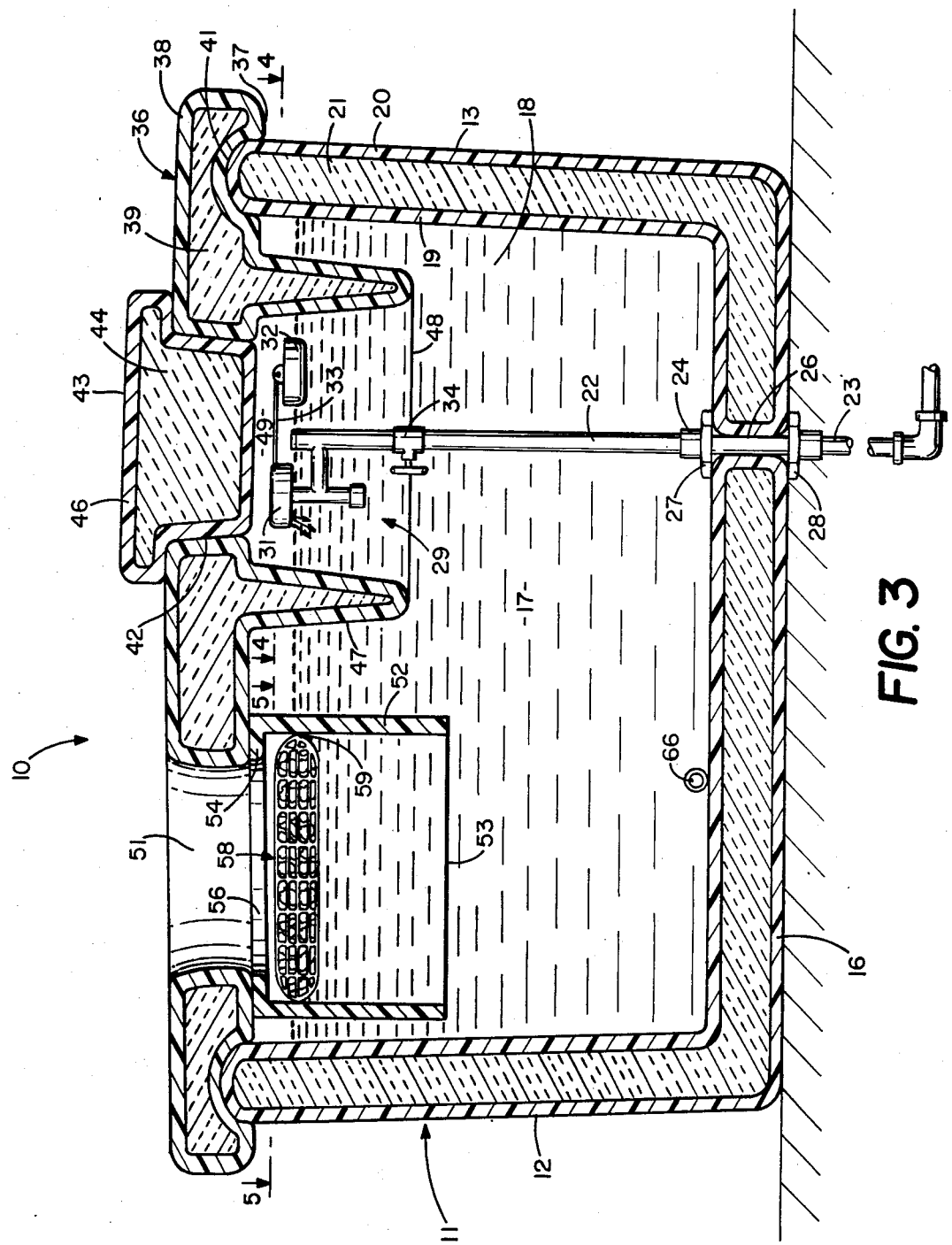
FIG. 3 is an enlarged sectional view taken along the line 3—3 of FIG. 1.

Referring to the drawing, there is shown in FIGS. 1 to 3, an animal watering apparatus of the invention indicated generally at 10 located on a support such as a concrete slab, floor or the like for providing a supply of water for animals, such as cattle, dairy cattle, horses, sheep, and the like. Apparatus 10 has a generally rectangular housing or tank 11 for storing a supply of water. As shown in FIG. 3, tank 11 has upright end walls 12 and 13 joined to upright side walls 14 and a flat bottom wall 16. Walls 12 to 14 and 16 form a chamber or reservoir 17 for accommodating water 18. Walls 12 to 14 and 16 have an inner shell 19 and an outer shell 20. The shells 19 and 20 are plastic material reinforced with glass fibers. The space between the shells 19 and 20 is filled with an insulation core 21, such as a urethane foam. Core 21 is attached to the inside surfaces of shells 19 and 20. A water inlet pipe 22 projects upwardly from bottom wall 16. A water supply pipe 23 located in the ground below tank 11 is connected with a connection 24 to pipe 22. Connection 24 includes a pipe that extends through a hole 26 in bottom wall 16. Nuts 27 and 28 seal connection 24 on bottom wall 16. Other types of connections can be used to supply water to pipe 22.

A float valve assembly indicated generally at 29 is connected to the top of pipe 22. Valve assembly 29 functions to control the discharge of water into tank chamber 17. Float valve assembly 29 has an on-off valve 31 operatively connected to a float 32 with an arm 33. When float 32 is in the raised position as shown in FIG. 3, valve 31 is closed. When the level of water 18 in tank chamber 17 is lowered, float 32 will move arm 33 in a downward direction to open valve 31. When valve 31 is open, water flows through valve 31 to fill the tank chamber 17. The pipe 22 accommodates an on-off valve 34 which can be used to manually shut off the flow of water to the float valve assembly 29 to permit adjustment and repair of valve 31.

A cover or top wall indicated generally at 36 closes the top of tank 11. Cover 36 has inner and outer shells 37 and 38 and a core 39 of insulation materials, such as urethane foam. The inner or bottom shell 39 has a peripheral groove 41 that accommodates the upper edge of the side and end walls of tank 11. Fasteners or adhesives can be used to secure the cover 36 to the top of tank 11. Elastic cords within tank chamber can be used to hold cover 36 on tank 11. The tank 11 and cover 36 can be a one-piece housing.

Cover 36 has a first hole 42 above float valve assembly 29. An insulated cap or plug 43 closes hole 42. Cap 43 can be removed from cover 36 to provide access to float valve assembly 29. Cap 43 has a core 44 of insulation material, such as urethane foam, surrounded with a shell 46 of plastic material reinforced with glass fibers. A downwardly directed generally circular shield or baffle 47 joined to the inner shell 37 surrounds float valve assembly 29. The water is free to circulate around baffle 47. The water discharged by the valve 31 is at the temperature of the supply water. This temperature may be warmer than the water in the tank. The baffle 47 retains the warmer water adjacent valve 31 and float 32 to further minimize freezing thereof in extreme cold weather. The shield 47 has a lower edge 48 that extends below the normal level of the water in tank chamber 17. Shield 47 provides a chamber 49 or dead air space that accommodates float valve assembly 29. The air in chamber 49 and the insulating characteristics of shield 47 and plug 43 protects float valve assembly 29 from cold temperatures which would freeze the water surrounding the float valve assembly.

Figure 5:
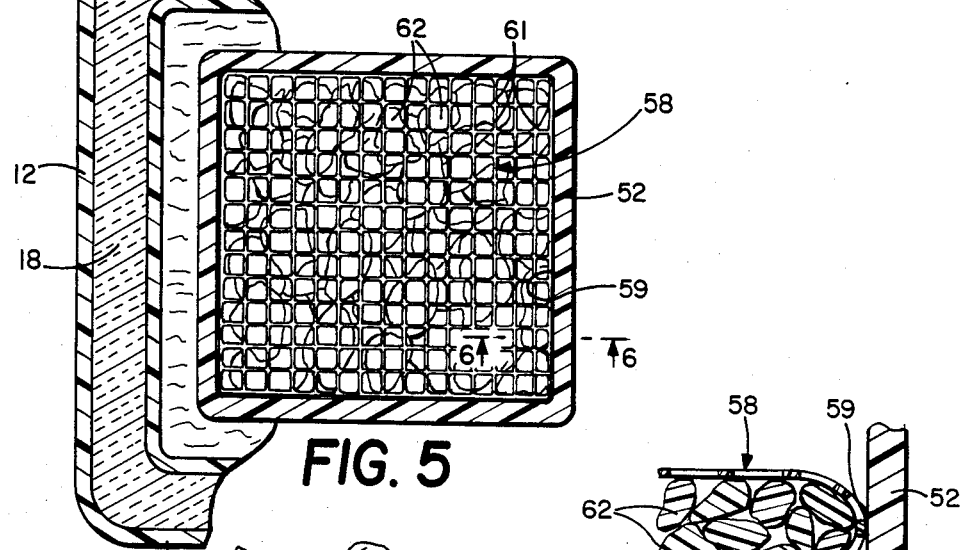
FIG. 5 is an enlarged sectional view taken along the line 5—5 of FIG. 3.

Cover 36 has a drinking well or second hole 51 open to the top of tank chamber 17. A generally square baffle 52 extends downwardly from the inner wall 37 into the water in chamber 17. As shown in FIG. 5, baffle 52 has side walls made of plastic reinforced with glass fibers that are spaced from end wall 12 and side walls 14 of the tank. Water surrounds the outside of the baffle 52 and is located within the baffle 52. Baffle 52 has a continuous lower edge 53 that is located below the normal level of the water in the tank chamber 17. The upper end of baffle 52 has an inwardly directed rim 54 having a central opening 56 aligned with the second hole 52. Baffle 52 is secured to the bottom shell 37 of cover 36. Baffle 52 can be an extension of the inner shell 37 of the cover. Baffle 52 can also be an integral part of shell 37. Opening 56 leads to a drinking well 57 that is surrounded by baffle 52. A floating closure member or porous gate 58 is located within drinking well 47. Closure member 58, as shown in FIG. 5, has a generally rectangular shape with an outer peripheral edge 59 located in contiguous relationship relative to the inside wall of baffle 52. Closure member 58 floats on top of the water and is vertically movable within drinking well 57 to insulate the water in the drinking well from the outside environment.

Figure 6:
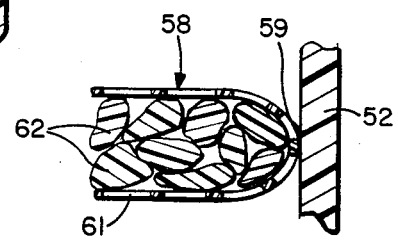
FIG. 6 is an enlarged sectional view taken along line 6—6 of FIG. 5.
Figure 7:
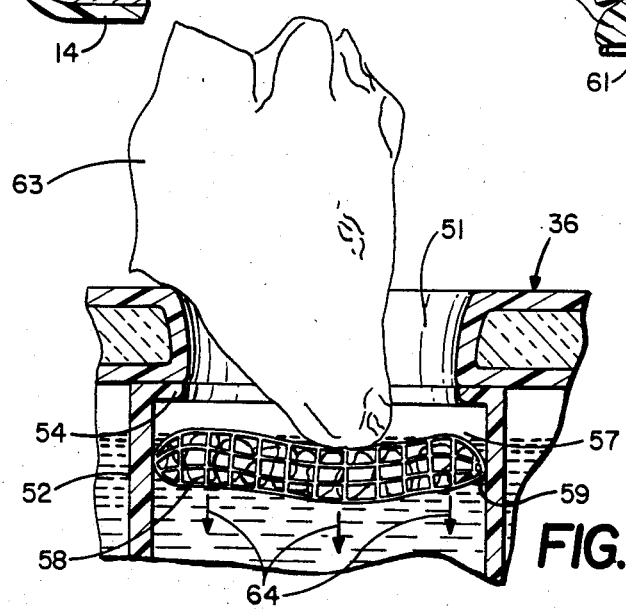
FIG. 7 is a sectional view of the drinking well of the animal watering apparatus and the representation of an animal drinking water.

As shown in FIG. 6, closure member 58 has a strand outer mesh 61 of plastic fibers arranged in a rectangular pattern. Other types of fibers can be used for mesh 61. The mesh 61 surrounds a plurality of foam plastic members 62. The foam plastic member can be pieces of polyurethane that floats on the surface of the water and does not absorb water. Closure member 58, when submerged in the water in drinking well 57 allows the water to flow through the foam plastic members 62 enable animal 63 to drink from the drinking well as shown in FIG. 7. Animal 63 will push the closure member 58 down as indicated by arrows 64. The water in drinking well 57 will flow through the closure member 50 so that water is available for drinking by animal 63. As soon as animal 63 removes its nose from closure member 58, it will return to its raised closed position. The water will flow down through the closure back into drinking well 57.

Figure 8:
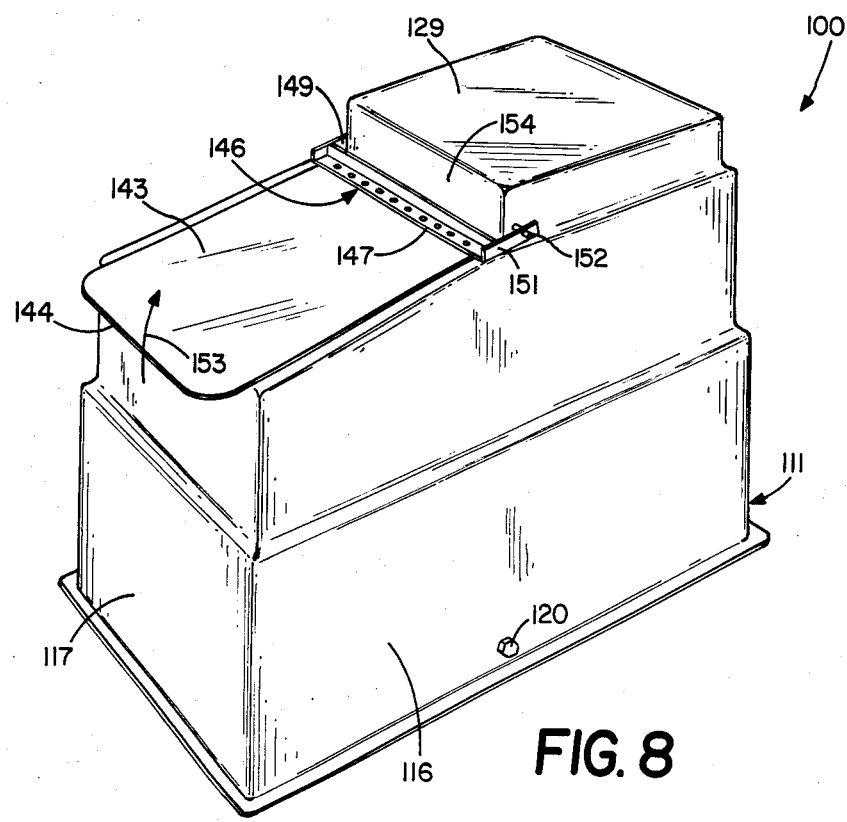
FIG. 8 is a perspective view of a modification of the animal watering apparatus of the invention.
Figure 9:
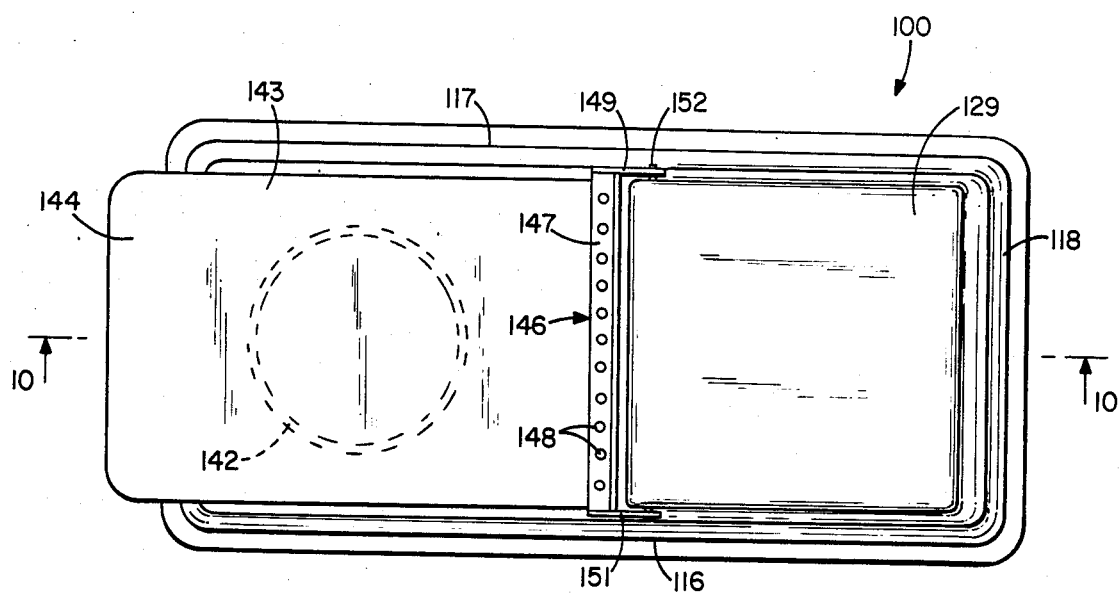
FIG. 9 is an enlarged top view of FIG. 8.
Figure 10:
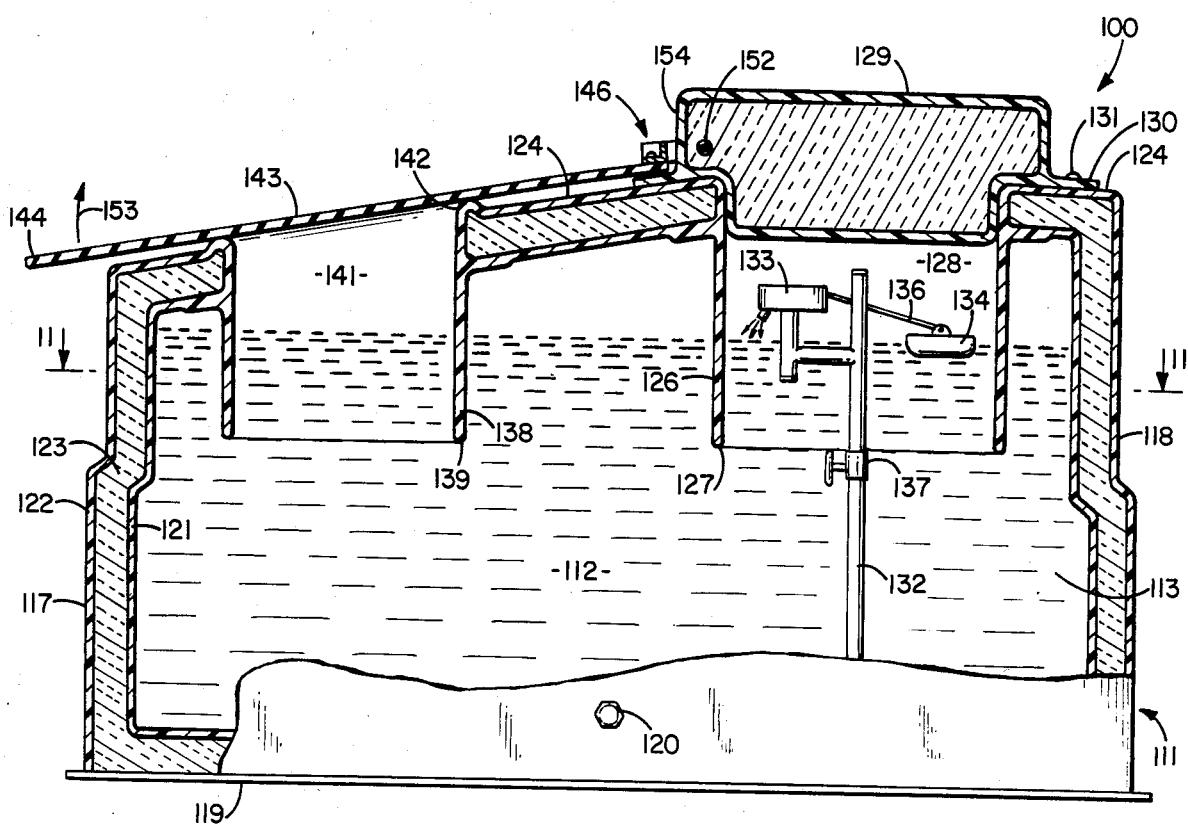
FIG. 10 is an enlarged partial sectional view taken along the line 10—10 of FIG. 9.

Referring to FIGS. 8 and 9, there is shown a modification of the animal watering apparatus indicated generally at 100 for providing a continuous supply of water for animals, such as cattle, dairy cattle, horses, sheep and the like. Watering apparatus 100 is usable in sub-zero weather without the use of special heaters to maintain a fresh supply of water for animals. Apparatus 100 has an insulated housing or tank 111 that holds a supply or reservoir of water 113 in an internal chamber 112. Water 113 is replenished into the chamber 112 as the animal drinks with a float valve assembly 133, 134 hereinafter described. Tank 111 has side walls 114 and 116 joined to end walls 117 and 118. The bottom of the tank is closed with a generally flat bottom wall 119. All of the walls have an inside plastic shell or skin 121, an outside plastic shell or skin 122 and an internal core 123 of heat insulated material, such as polyurethane foam. These materials are moisture resistant and do not deteriorate or break down. Shells 121 and 122 are fiber reinforced plastic attached to the urethane foam core 123. Housing 111 has a top wall indicated generally at 124 joined to the side walls 114, 116 and end walls 117, 118. Top wall 124 has a first downwardly extended tubular baffle 126 terminating in a lower continuous edge 127. Baffle 126 is spaced inwardly from the inside of the side walls 114 and 116 and end wall 118, as shown in FIG. 10, so that the lower portion of the baffle is surrounded with water. The water circulates around and within the baffle to minimize freezing of the float valve 133. Baffle 126 has an upright opening or chamber 128 that is normally closed with a dome or cap 129. The cap 129 has an outwardly directed annular lip 130 that fits over top wall 124 around opening 128. Lip 130 has a generally rectangular shape and accommodates screws 131 that secure cap 129 to top wall 124.

Figure 4:
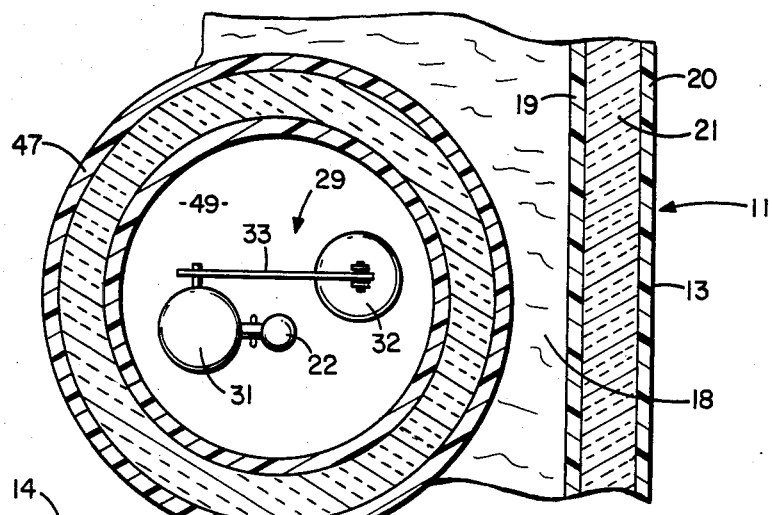
FIG. 4 is an enlarged sectional view taken along the line 4—4 of FIG. 3.

The water is supplied to tank chamber 112 through an upright water pipe 132 attached to a water supply line. The water supply can be an underground water line operably joined to a water pump to supply water under pressure to pipe 132. A float operated valve 133 is joined to the upper end of pipe 132. Valve 133 is operated with a float 134 resting on the top surface of water 113. An arm 136 is pivotally connected to float 134 and the valving mechanism (not shown) of valve 133. When float 134 moves in the down position, it rotates arm 136 in a clockwise direction to turn valve 133 on. The water is then discharged into tank chamber 112. When the level of the water is reached a predetermined level, the float acting on arm 136 moves in a counter clockwise direction to turn valve 133 off. A manually operated on-off valve 137 is interposed in pipe 132 is operable to shut off the water supply to valve 133. Float valve assembly is a commercial product. An example of a suitable float valve assembly is disclosed by Barker et al in U.S. Pat. No. 3,835,882. Other types of float valves can be used to maintain the level of water 113 in tank chamber 112. Valve 133 and float 134 are located in the air chamber 128 formed by the first baffle 126 and cap 129. The baffle 126, water 112, and cap 129 insulate the valve 133 and float 134 from the outside cold environment. This prevents the valve 133 from freezing in cold weather. As shown in FIGS. 3 and 4, shield 47 is spaced inwardly from adjacent end and side walls of tank 11. Water is free to circulate about shield 47 thereby insulating the shield from the outside cold environment.

Figure 11:
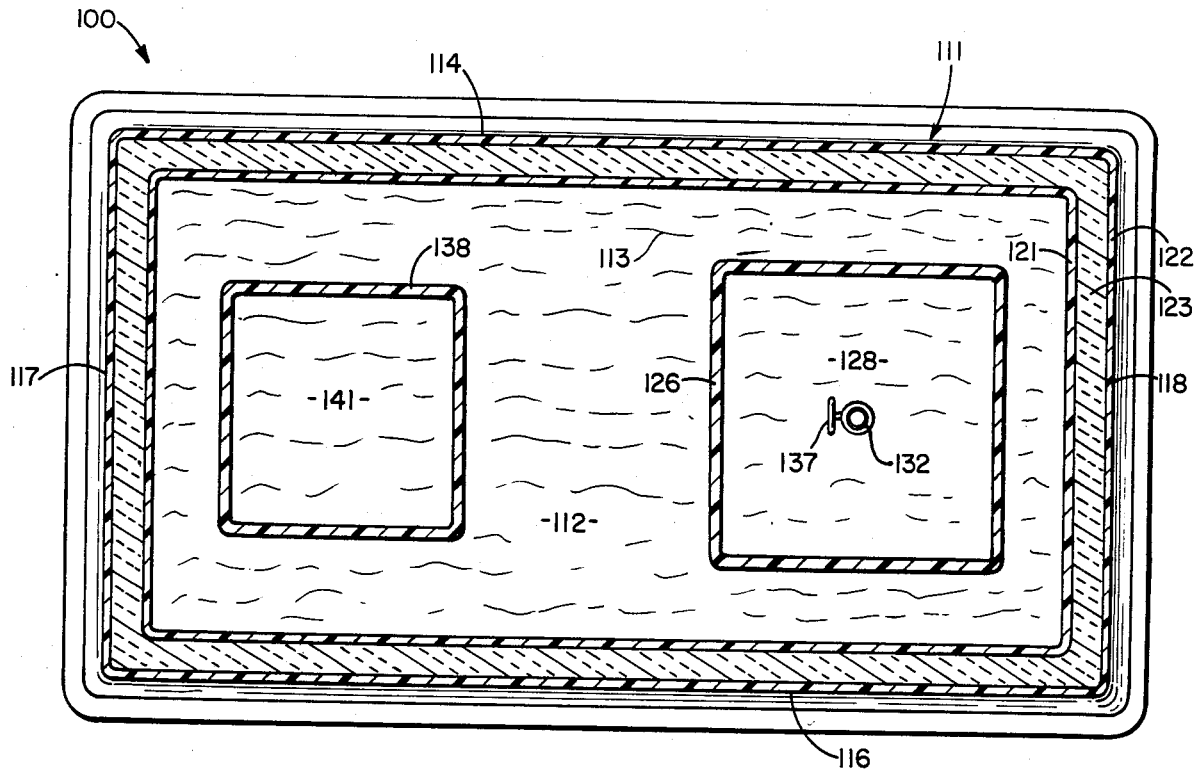
FIG. 11 is a sectional view taken along the line 11—11 of FIG. 10.

Referring to FIGS. 10 and 11, a second downwardly extended tubular baffle 138 is joined to the top wall 124. Second baffle 138 has a lower continuous edge extended down into water 113 in general horizontal alignment with the lower edge 127 of first baffle 126. Second baffle 138 has a generally square shape and provides a drinking well 141 open to the top wall 124. The top wall 124 has an upwardly directed annular lip 142 surrounding a circular open top of drinking well 141. As shown in FIG. 10, second baffle 138 is spaced inwardly from the side walls 114 and 116 and end wall 117 providing a water and air barrier between second baffle 138 and the walls of housing 111. The water is free to flow about second baffle 138 therby minimizing the freezing of the water in the drinking well 141. Second baffle 138 is also horizontally spaced from the first baffle 126 so as not to interfere with the circulation of water about baffles 126 and 138.

A generally flat lid or cover 143 is located over drinking well 141. Cover 143 is a rubber or plastic sheet having an outer edge or lip 144 that extends outwardly from the end wall 117 as shown in FIGS. 8, 9, and 10. Lip 144 enables the animal to utilize its nose to move the cover 143 upwardly in the direction of the arrow 153 to provide access to drinking well 141.

A hinge assembly indicated generally at 146 pivotally mounts cover 143 to cap 129. Hinge assembly 146 has a transverse bar 147 accommodating a plurality of fasteners, such as bolts, rivets, and the like, for attaching the inner end of cover 143 to bar 147. A pair of arms 149 and 151 are secured to opposite ends of bar 147. A transverse pivot rod 152 pivotally extends into the free ends of arms 149 and 151 to pivotally attach the hinge assembly 146 to cap 129. When cover 143 is moved upwardly in the direction of arrow 153 to the open position bar 147 will engage the upper portion of front edge 154 of cap 129 to prevent cover 143 from flipping over and keeping the drinking well 141 open. In use, as soon as the animal moves its head away from cover 143, the cover 143 will automatically drop or swing down to its closed position as shown in FIGS. 8 and 10.

While there has been shown and described preferred embodiments of an animal watering apparatus according to the invention, it will be apparent to those skilled in the art that changes in structure, shapes and material may be made without departing from the scope and spirit of the invention. For example, the animal watering apparatus according to the invention can be provided with two drinking wells with the float valve assembly located between the drinking wells.

The embodiments of the invention in which an exclusive property or privilege is claimed are defined as follows:

1. An animal watering apparatus comprising: housing means having generally upright walls, and a bottom wall surrounding an internal chamber for accommodating water, and a top wall joined to the upright walls closing the top of the chamber, said top wall having first baffle means extended down into the chamber surrounding an opening open to said chamber in the upper portion of the chamber, said upright walls to allow water to circulate around said first baffle means, said opening being adapted to accommodate means for supplying water to said chamber, said top wall having second baffle means extended into the chamber, said second baffle means being spaced inwardly from the upright walls to allow water to circulate around said second baffle means, said second baffle means surrounding a drinking well open to the top of said top wall and chamber to provide animal access to the water in the chamber, and float closure means located in said drinking well, said closure means having porous means allowing water to flow through said closure means and an open mesh cover surrounding said porous means.

2. The apparatus of claim 1 wherein: said first baffle means has a continuous annular wall terminating in a bottom edge located below the normal level of the water within the housing chamber, said second baffle means has a continuous annular wall terminating in a bottom edge spaced from the first baffle means and located below the normal level of the water in the chamber.

3. The apparatus of claim 1 wherein: said first baffle means has a continuous wall terminating in a bottom edge located below the normal level of the water within the housing chamber.

4. The apparatus of claim 1 wherein: said second baffle means has a continuous wall terminating in a bottom edge located below the normal level of the water in the housing chamber.

5. The apparatus of claim 1 wherein: said opening is open to the outside of the top wall, and cap means having an insulated body inserted into the upper portion of the opening to close said opening.

6. The apparatus of claim 5 wherein: said cap means has an annular lip surrounding said opening engageable with the top of the top wall.

7. The apparatus of claim 1 wherein: said porous means comprises a plurality of foamed plastic members.

8. The apparatus of claim 1 wherein: said second baffle means has an inside dimension larger than the drinking well opening in the top wall, said float closure means being larger than said drinking well opening in the top wall.

9. An animal watering apparatus comprising: a housing having generally upright heat insulated side and end walls and a heat insulated bottom wall surrounding an internal chamber for accommodating water, said housing having a heat insulated top wall joined to the upright side and end walls to cover the top of said chamber, said top wall having first tubular baffle means extended downwardly into said chamber and into the water in said chamber when said chamber is full of water, said top wall and first baffle means having an opening open to said chamber and to the outside of the top wall, said first baffle means being spaced inwardly from the upright side walls and an end wall to allow water to circulate around said first baffle means, cap means mounted on the top wall closing said opening, means for supplying water to said chamber located within said opening below said cap means, said cap means being removable from said top wall to provide access to the opening and internal chamber and the means for supplying water to said chamber located within said opening, said top wall having second tubular baffle means projected downwardly into said chamber and into the water in the chamber when said chamber is full of water, said second baffle means being spaced inwardly from the upright side walls and from an end wall and spaced from the first baffle means to allow water to circulate around said second baffle means, said second baffle means and top wall having a drinking well open to said top wall and said chamber to provide animal access to the water in the chamber, and closure means for closing said drinking well, said closure means being movable by an animal to provide animal access to the water therein, said closure means comprising a float closure located in said drinking well, said float closure having porous means allowing water to flow through said closure, and an open mesh cover surrounding said porous means.

10. The apparatus of claim 9 wherein: said porous means comprises a plurality of foam plastic members.

11. The apparatus of claim 9 wherein: said second baffle means has an inside dimension larger than the drinking well opening in the top wall, said float closure being larger than said drinking well opening in the top wall.

12. The apparatus of claim 9 wherein: said cap means has an insulated body inserted into the upper portion of the opening to close said opening.

13. The apparatus of claim 9 wherein: said cap means has an insulated body positioned in the upper portion of the opening to close said opening and an annular lip surrounding said flange.

14. An animal watering apparatus comprising: housing means having generally upright walls and a bottom wall surrounding an internal chamber for accommodating water, and a top wall joined to the upright walls closing the top of the chamber, said top wall having at least one drinking well opening to provide animal access to the water in the chamber, (a) baffle means secured to said top wall, said baffle means comprising a baffle wall having an inside surface surrounding a drinking well, said drinking well being aligned with said at least one drinking well opening, said wall of the baffle means extended downwardly into said chamber below the normal level of the water in the chamber, and float closure means located in the drinking well surrounded by said baffle wall below said at least one drinking well opening, said float closure means providing a barrier to separate the outside air in the at least one drinking well opening from the water in the chamber, said float closure means comprising a flexible porous float having an outer peripheral edge located in contiguous relationship relative to the inside surface of the baffle wall allowing water to flow through said float whereby when an animal moves the float down into the drinking well the outer peripheral edge of the flexible porous float moves relative to said inside surface of the baffle wall and water flows through the float making water available for drinking by the animal.

15. The apparatus of claim 14 wherein: said baffle wall has an inside dimension larger than said at least one drinking well opening in the top wall, said float being larger than said at least one drinking well opening.

16. The apparatus of claim 15 wherein: said baffle wall comprises an annular continuous side wall extended downwardly into the water in the chamber and spaced inwardly from said upright walls to allow water to circulate around said baffle wall, said outer peripheral edge of the float being engageable with said annular side wall to close said at least one drinking well opening.

17. An animal watering apparatus comprising: housing means having generally upright walls and a bottom wall surrounding an internal chamber for accommodating water, and a top wall joined to the upright walls closing the top of the chamber, said top wall having at least one drinking well opening to provide animal access to the water in the chamber, baffle means secured to said top wall, said baffle means surrounding a drinking well, said drinking well being aligned with said at least one drinking well opening, said baffle means extended downwardly into said chamber below the normal level of water in the chamber, and float closure means located in the drinking well surrounded by the baffle means below said at least one drinking well opening, said float closure means providing a barrier to separate the outside air in the at least one drinking well opening from the water in the chamber, said float closure means comprising a porous float allowing water to flow through said float whereby when an animal moves the float down into the drinking well, water flows through the float making water available for drinking by the animal, said porous float includes porous material and an open mesh means surrounding said porous material allowing water to flow through said float.

18. The apparatus of claim 17 wherein: said porous material includes a plurality of foam plastic members, said open mesh means surrounding said foam plastic members allowing water to flow through said porous float.

19. An animal watering apparatus comprising: housing means having side walls and a bottom wall providing an internal chamber for accommodating water, and a top wall joined to the side walls closing the top of the chamber, said top wall having a drinking first opening open to the internal chamber whereby an animal can drink water in the internal chamber and a second opening spaced from the first opening, baffle means joined to said top wall extended down into the water in said chamber, said baffle means having a passage aligned with the second opening and open to the water in said chamber, cap means mounted on the top wall closing said second opening, means for supplying water to said chamber located within said passage below said cap means, said cap means having means to allow the cap means to be removed from the top wall providing access to said means for supplying water to said chamber, cover means normally closing said first opening in the top wall, and hinge means secured to the cover means and to said cap means to allow the cover means to swing upwardly away from said first opening whereby an animal can move the cover means to an open position and drink water from the chamber, said cover means being normally in a closed position closing said first opening in the top wall, said cap means mounting the cover means on said top wall of the housing means.

20. The apparatus of claim 19 wherein: the cap means has an insulated body inserted into the upper portion of the second opening to close said second opening.

21. The apparatus of claim 20 wherein: said cap means has an annular lip surrounding said second opening engageable with the top of the top wall.

22. The apparatus of claim 19 including: second baffle means having a drinking well located below said first opening in the top wall, said second baffle means being joined to the top wall and extended into the water in the chamber.

23. The apparatus of claim 19 wherein: said baffle means comprises a first baffle joined to the top wall extended down into the water in the chamber, said first baffle being spaced inwardly from said side walls to allow water to circulate around said first baffle, and a second baffle means having a drinking well located below said first opening in said top wall, said second baffle means being joined to the top wall and spaced inwardly from the side walls to allow water to circulate around the second baffle means, said second baffle means extended into the water in the chamber to provide animal access to the water in the chamber.

* * * * *